US010178106B1

(12) United States Patent
Ashley et al.

(10) Patent No.: US 10,178,106 B1
(45) Date of Patent: Jan. 8, 2019

(54) APPARATUS AND METHOD FOR IDENTIFYING AND WARNING OF SYNTHETIC IDENTITY BEHAVIOR THAT REDUCES USER PRIVACY

(71) Applicant: Anonyome Labs, Inc., Draper, UT (US)

(72) Inventors: Paul Ashley, Queensland (AU); Steve Shillingford, Draper, UT (US); Neil Readshaw, Queensland (AU); Simon Gee, Queensland (AU); Greg Clark, San Francisco, CA (US); Phong Le, Salt Lake City, UT (US)

(73) Assignee: Anonyome Labs, Inc., Draper, UT (US)

( * ) Notice: Subject to any disclaimer, the term of this patent is extended or adjusted under 35 U.S.C. 154(b) by 21 days.

(21) Appl. No.: 14/712,713

(22) Filed: May 14, 2015

Related U.S. Application Data (60) Provisional application No. 62/060,497, filed on Oct. 6, 2014.

(51) Int. Cl.
*H04L 29/06* (2006.01)
*G06F 21/62* (2013.01)

(52) U.S. Cl.
CPC ...... *H04L 63/1408* (2013.01); *G06F 21/6254* (2013.01); *H04L 63/10* (2013.01)

(58) Field of Classification Search
CPC .................................................. H04L 63/1408
USPC .......................................................... 726/26
See application file for complete search history.

(56) References Cited

U.S. PATENT DOCUMENTS

| 6,230,188 | B1 * | 5/2001 | Marcus .................. H04L 51/28 709/206 |
| 7,831,995 | B2 * | 11/2010 | Futoransky ........... H04L 63/102 713/182 |
| 8,650,213 | B2 * | 2/2014 | Aggarwal ......... G06F 17/30539 705/51 |
| 2001/0034723 | A1 * | 10/2001 | Subramaniam ........ G06Q 20/02 705/74 |
| 2004/0064561 | A1 * | 4/2004 | Parsons ............... H04L 61/3015 709/226 |
| 2005/0038788 | A1 * | 2/2005 | Dettinger ............ G06F 21/6227 |
| 2005/0257148 | A1 * | 11/2005 | Goodman ............. G06F 17/243 715/226 |

(Continued)

FOREIGN PATENT DOCUMENTS

| EP | 0855659 A1 * | 7/1998 | .......... G01M 13/021 |
| EP | 0855659 A1 * | 7/1998 | .......... G01M 13/021 |

*Primary Examiner* — Peter C Shaw
(74) *Attorney, Agent, or Firm* — Cooley LLP (57) ABSTRACT

A non-transitory computer readable storage medium has instructions executed by a processor to collect mobile device environment parameters. Identity attributes including real identity attributes for a real individual and at least one set of synthetic identity attributes are stored. An electronic communication attempt by a designated entity corresponding to either the real identity attributes or the at least one set of synthetic identity attributes is monitored. The electronic communication attempt is analyzed in connection with the mobile device environment parameters and identity attributes to identify a rule transgression. A warning is supplied in connection with the electronic communication attempt in response to the rule transgression.

8 Claims, 12 Drawing Sheets

(56) References Cited

U.S. PATENT DOCUMENTS

| | | | | |
|---|---|---|---|---|
| 2007/0250920 A1* | 10/2007 | Lindsay | ............ | G06F 21/31 |
| | | | | 726/7 |
| 2010/0293090 A1* | 11/2010 | Domenikos | ............ | G06Q 10/04 |
| | | | | 705/38 |
| 2013/0036458 A1* | 2/2013 | Liberman | ............ | H04L 9/3231 |
| | | | | 726/6 |
| 2014/0013406 A1* | 1/2014 | Tremlet | ............ | G06F 21/32 |
| | | | | 726/5 |

* cited by examiner

APPARATUS AND METHOD FOR IDENTIFYING AND WARNING OF SYNTHETIC IDENTITY BEHAVIOR THAT REDUCES USER PRIVACY

CROSS-REFERENCE TO RELATED APPLICATION

This application claims priority to U.S. Provisional Patent Application Ser. No. 62/060,497, filed Oct. 6, 2014, the contents of which are incorporated herein by reference.

FIELD OF THE INVENTION

This invention relates generally to communications in computer networks. More particularly, this invention relates to techniques for identifying and warning of synthetic identity behavior that reduces user privacy.

BACKGROUND OF THE INVENTION

With the current state of identity theft, uncontrolled data collection and targeted marketing, there is a need for a user to protect their primary identity and to compartmentalize their online activity. For example, the user might prefer to use their primary identity for general browsing or reading online newspapers, use a different identity for accessing and commenting on social media, another for purchasing from e-commerce applications, and still another identity for selling their furniture.

One method to achieve this compartmentalization is to allow a user to create multiple synthetic identities and then use them for different purposes. Each synthetic identity would have its own identity attributes which may include name, address, phone number, email, social media attributes, credit and more. Each synthetic identity should be used for a limited and specific purpose, so that tracking of that identity would not form a complete picture of the user's activity. The synthetic identities act as a personal privacy proxy, preventing Internet services access to the user's primary identity.

Some of the key differences between the use of a primary identity and synthetic identities are requirements of separate identity attributes, communications capabilities and strong compartmentalization. It is not uncommon for a user to have multiple email addresses (e.g., Gmail® accounts so that they can compartmentalize their email use). This might be to separate their online shopping (spam) email from other personal email. However, outside of a different email address the user has the same identity attributes on each account and it is less likely that the user will need multiple separate address books, separate phone numbers for voice and messaging, separate accounts for social media and so on.

When using synthetic identities the concept of unique identity attributes and compartmentalized communication is important. Each synthetic identity may require an individual email address, phone number for voice calls and messaging, address book, social media accounts, credit, and delivery address, so that very strong compartmentalization is achievable. With these requirements comes the complexity of how the user can act with their synthetic identities without inadvertently impacting the privacy of their own primary identity.

For example, a user accesses a web site using a synthetic identity, where that synthetic identity possesses identity attributes different than the user's primary identity. Inadvertently, the user may enter their primary identity name into the site, such as signing off a comment on a news article, or the name details on a registration page.

A new solution is required where the user can be provided assistance when operating as a synthetic identity. The solution should aid the user in communicating as their synthetic identity and in their choice of synthetic identity. The solution should facilitate a clear identification of the synthetic identity in use and notify a user if the activities of their synthetic identity are risking the privacy of their primary identity.

One solution is to allow the user to support their different synthetic identities using multiple mobile phones, email services, and browsers, and have a distributed model of monitoring agents on the different technologies. Consider the case where the user has two synthetic identities each with their own mobile phone, email account, browser, and social media account. In this scenario, software agents have access to each service. For example, a Safari® agent is able to monitor (and control) a synthetic identity's web browsing, protecting the user from undermining the privacy of their primary identity. This is a very complex implementation from the point of view of the user as they are required to juggle multiple mobile phones, email services, social media accounts, and different browsers. The burden is on the user to keep their primary identity and synthetic identities separate. Additionally, the implementation is very complex from a technical point of view in that there is a requirement to build agents for the various technologies and services (with the maintenance problem of keeping these agents current). There is also a requirement to allow these agents to communicate through some coordinating service. For example, it would be advantageous to have a view across the address books to identify the same contacts in multiple synthetic identity address books that might suggest a loss of compartmentalization.

Therefore a new kind of solution is required that provides both a convenient approach for the user to act fully as a synthetic identity and a robust approach to assist the user to avoid synthetic identity activities that reduces the privacy of their primary identity.

SUMMARY OF THE INVENTION

A non-transitory computer readable storage medium has instructions executed by a processor to collect mobile device environment parameters. Identity attributes including real identity attributes for a real individual and at least one set of synthetic identity attributes are stored. An electronic communication attempt by a designated entity corresponding to either the real identity attributes or at least one set of synthetic identity attributes is monitored. The electronic communication attempt is analyzed in connection with the mobile device environment parameters and identity attributes to identify a rule transgression. A warning is supplied in connection with the electronic communication attempt in response to the rule transgression.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

A single mobile application supports communication for multiple synthetic identities allowing the user in one application the capabilities for separate voice calls, messages, emails, address books, social media interaction and compartmentalized browsing. The user selects which synthetic identity is used to communicate. Additionally, the mobile application provides the user assistance to stay in the synthetic identity context by providing user notifications and full monitoring and analysis capability to protect the user from inadvertently impacting their primary identity.

Figure 1:
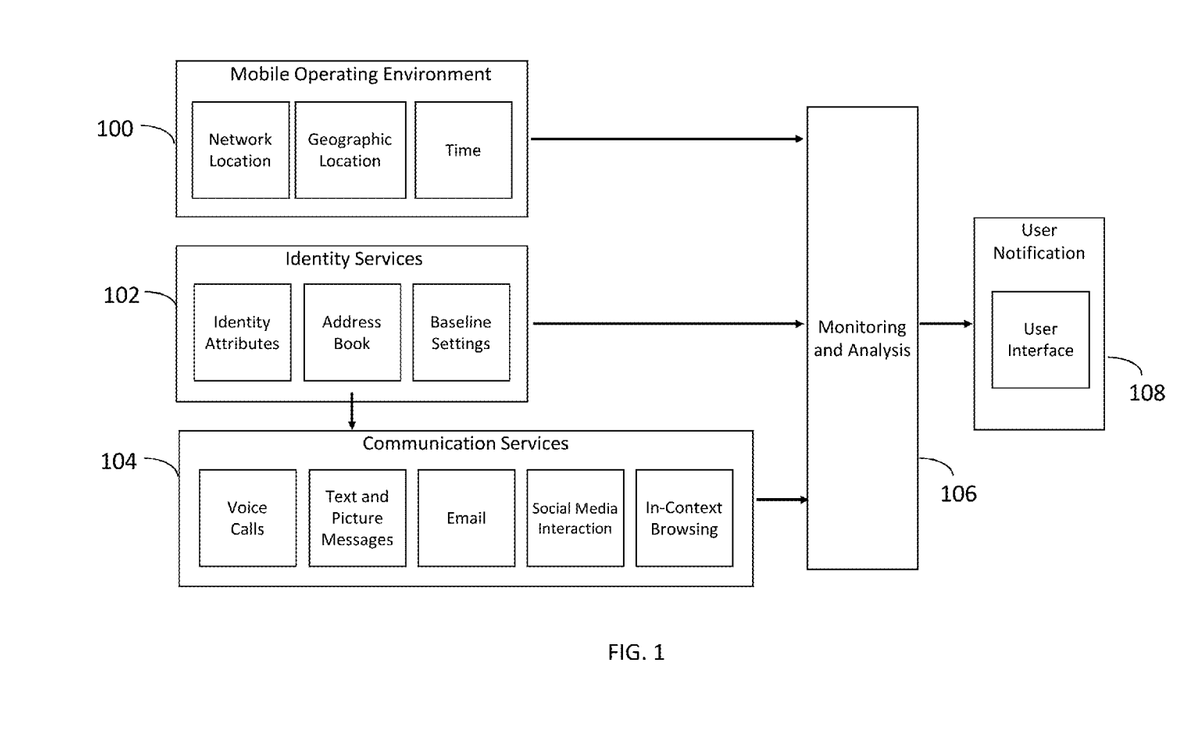
FIG. 1 illustrates processing blocks associated with an embodiment of the invention.

FIG. 1 shows a view of the mobile application highlighting the key components related to assisting the user to stay in the right identity context. The mobile operating environment 100 provides the mobile application with information about the current environment. In one embodiment, this includes the mobile device's network location, geographic location and time.

The mobile operating environment 100 includes real time values provided by the operating system to the mobile application. These values aid in determining if the synthetic identity is being used in the right context. Network location identifies the current IP network that the application is running on. This could be a fixed line, Wi-Fi network or 3G/4G network. The value may be a network SSID label or IP address when SSID is not available.

Geographic location identifies the current geographic location where the application is being used. Two different methods can be used for working out the location. The GPS location can be used when the user has a device that can read the current GPS coordinates. A downside to using GPS coordinates in processing is heavy battery usage for the mobile device. An alternative implementation is to use one of the common beacon technologies (e.g., iBeacon® from Apple®). These are Bluetooth devices that broadcast a signal a short distance from their location. The mobile application is configured to activate when close to a beacon. The beacon technologies have some advantages over GPS such as reduced battery usage, more accurate location determination, mobility of target e.g. work vehicle, and is also able to transmit different identifiers e.g. Salt Lake City office vs Palo Alto office. Time identifies the current time, as maintained by the mobile device.

Figure 2:
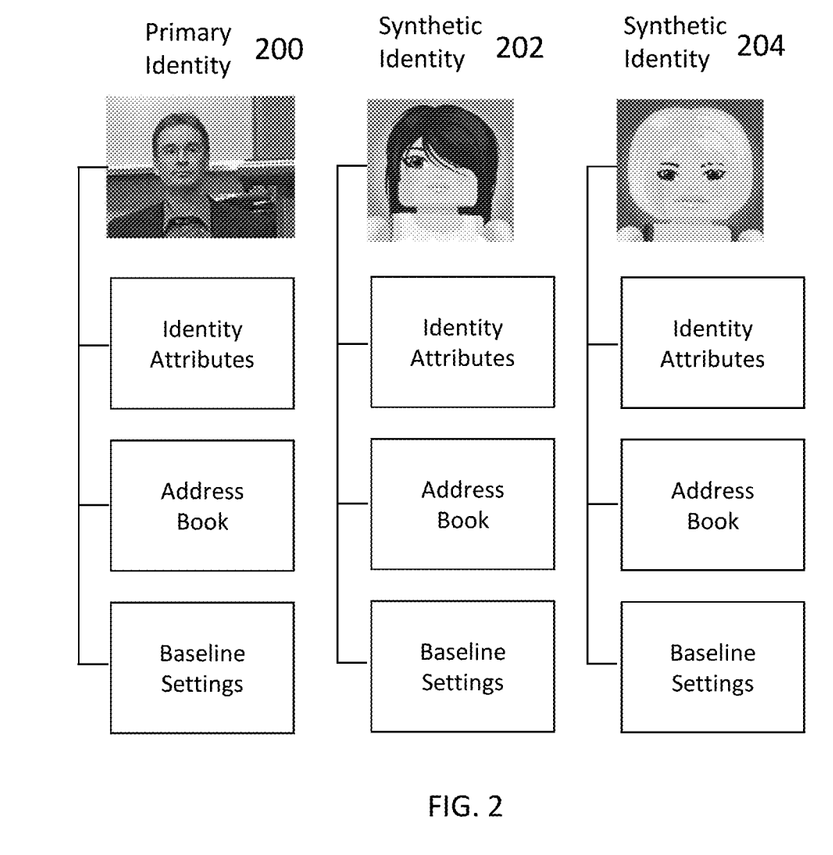
FIG. 2 illustrates an identity attribute data structure for multiple identities utilized in accordance with an embodiment of the invention.

The identity services 102 provide the identity's attributes, the identity's address book and the identity's baseline settings. Each identity has a set of attributes that defines the identity. This includes, but is not limited to title, avatar, first and last name, date of birth, gender, email address, phone number, credit card number, delivery address and social media account information. FIG. 2 illustrates identity attributes, address book and baseline settings for each of a primary identity 200, a first synthetic identity 202 and a second synthetic identity 204.

Figure 3:
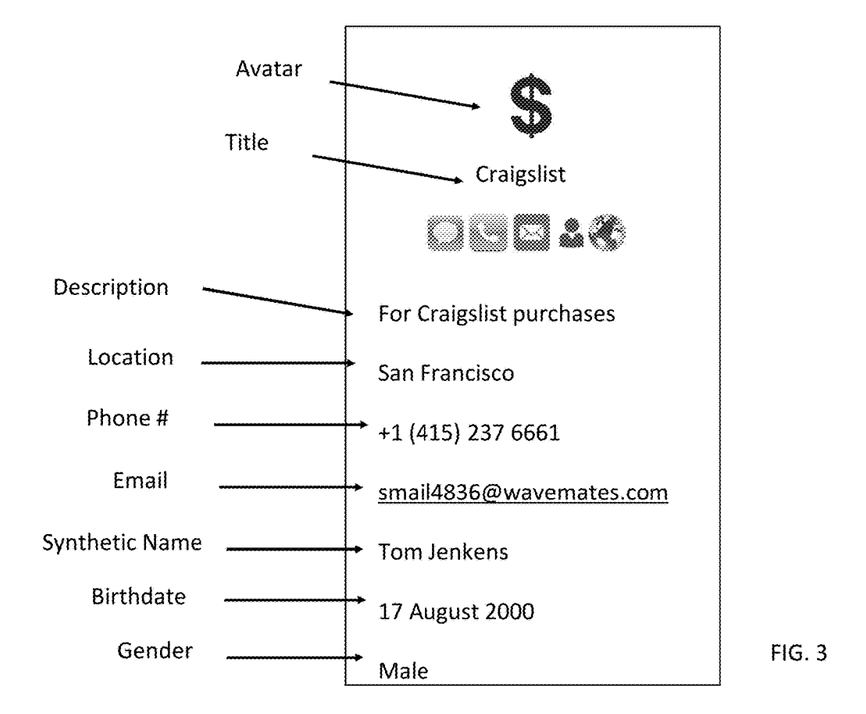
FIG. 3 illustrates an identity attribute data structure utilized in accordance with an embodiment of the invention.

In one embodiment, each identity has its own address book of contacts. This address book is used by the communication services and for analysis of identity activities. The system allows contacts to be imported and exported to other address books. FIG. 3 shows a mobile user interface for defining attributes for a synthetic identity titled "Craigslist" with avatar "$". The identity attributes may include a description and location. Address book information, such as phone number, email, synthetic name, birthdate and gender may also be included.

Figure 4:
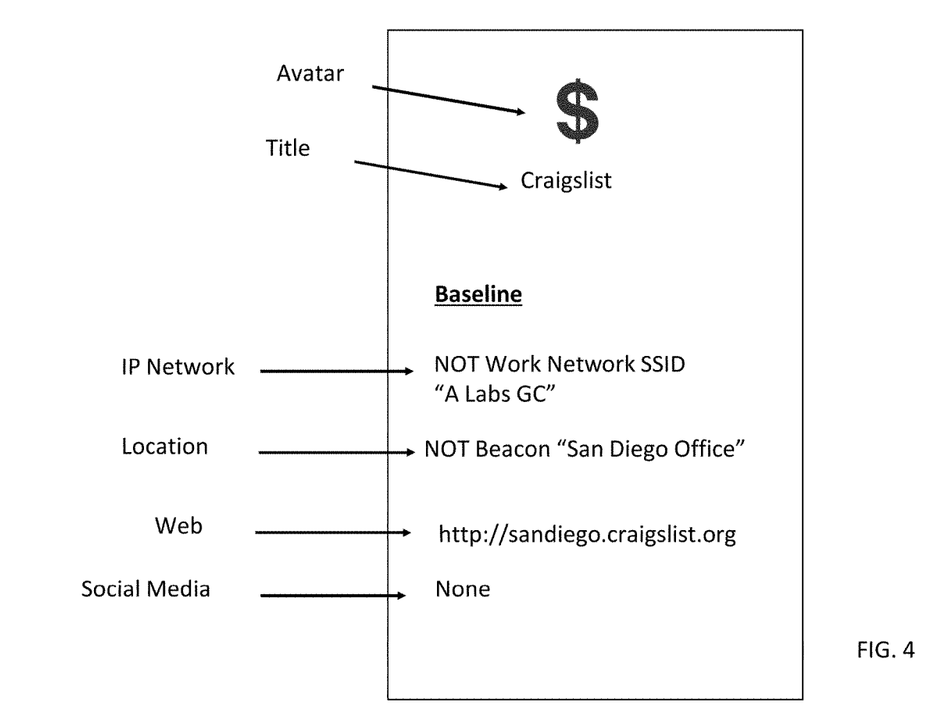
FIG. 4 illustrates a data structure with specified permissions for a synthetic identity.

The baseline settings are a set of parameters configured in advance for the use of the identity. As shown in FIG. 4, its aim is to define the usage boundaries for the identity. Network location identifies the IP network that the synthetic identity is permitted to use, or specifically not use. In FIG. 4, the synthetic identity should not be used on the user's business (work) network. The network is identified by its network SSID label.

Geographic location is similar to specific IP networks. The location setting will indicate where the synthetic identity should and should not be used. This location could be based on GPS coordinates, or based on identifiers from a beacon. In FIG. 4, the synthetic identity should not be used at the user's workplace defined by a beacon at the workplace building with identifier "San Diego Office". A time parameter may be defined to specify specific days or times in the week that the synthetic identity should or should not be used.

A web sites field defines the web sites that may be accessed by the synthetic identity. The web sites may be defined by web category e.g. news sites, in which case an external web classification service is used. Because of the broadness of the web categories, the user might instead prefer to list individual whitelisted and blacklisted URLs. In FIG. 4 only the Craigslist web site in San Diego should be accessed by this synthetic identity. A social media field lists particular social media sites appropriate for the synthetic identity. In FIG. 4 it is specified that no social media sites should be accessed by this synthetic identity.

Figure 5:
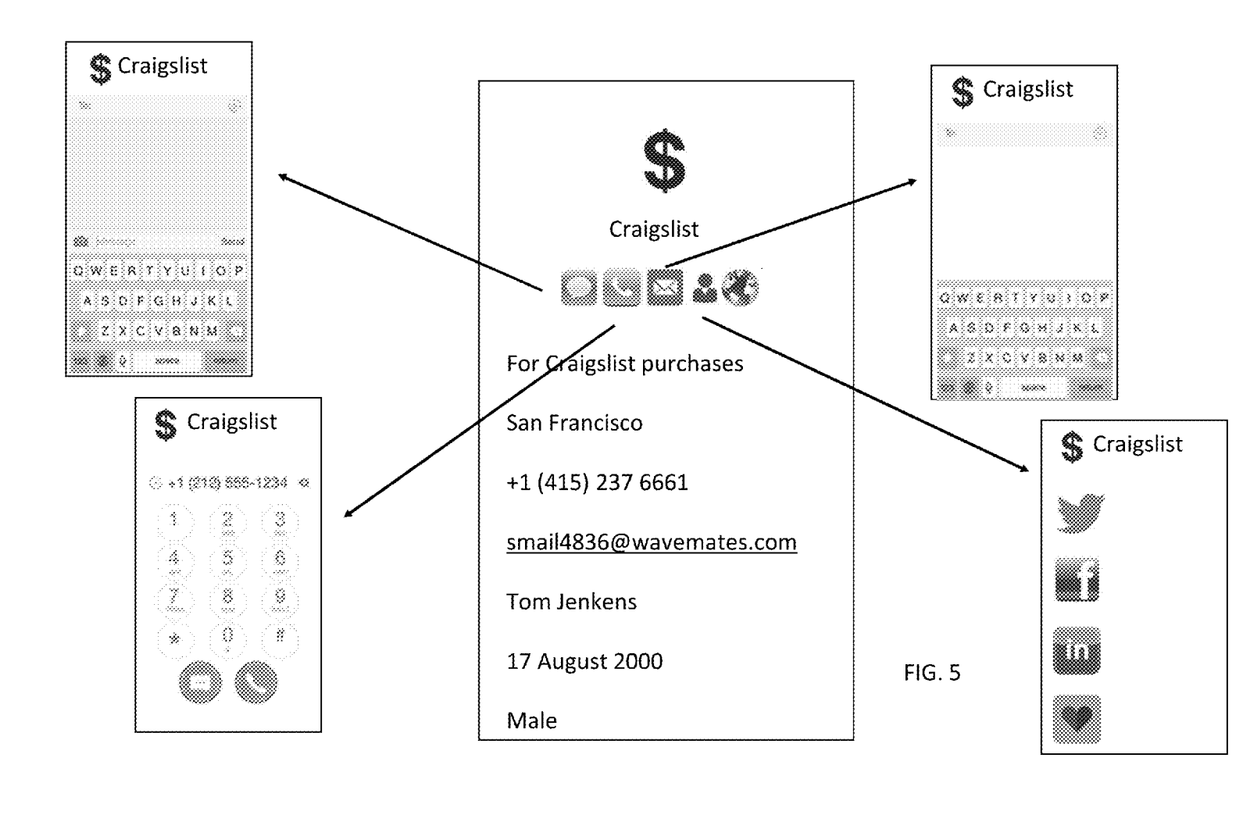
FIG. 5 illustrates communication services utilized by a synthetic identity.

The communication services 104 provide each identity with separate communication capabilities, such as voice calling, text and picture messaging, email, social media interaction and in-context browsing. FIG. 5 shows how the mobile application provides access to individual communication services for the synthetic identity. From the synthetic identity details page the user is able to access messaging, voice calling, emailing, social media interaction and in-context browsing. Note that each of the communication pages clearly identifies the synthetic identity in use (i.e., $ Craigslist).

Figure 6:
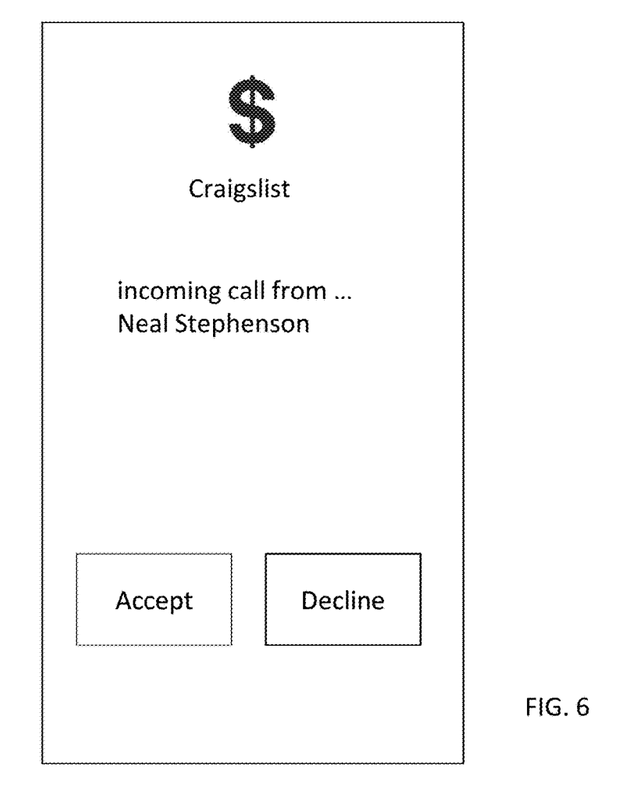
FIG. 6 illustrates a notification utilized in accordance with an embodiment of the invention.

The mobile application provides a voice over IP (VoIP) based service so that it allows each synthetic identity to make and receive voice calls using a different phone number. The synthetic identity phone numbers are unrelated to the number assigned to the mobile device. This is relatively easy to achieve as it is possible to provision a VoIP phone number and to route the calls, using an external telephony cloud provider (e.g., Twilio®). One interesting aspect of voice calls when using synthetic identities is how to identify when a call is incoming to the mobile application. Whereas a typical phone just identifies the caller, when having multiple identities the receiver needs to understand both which synthetic identity is being called, and who the caller is. This is shown in FIG. 6, where the caller is "Neal Stephenson" and the synthetic identity is Craigslist.

Leveraging the same phone number used for voice calls, the external provider also allows sending/receiving of text and picture messages. Again, this is relatively easy to achieve using an external telephony provider.

The application provides individual email accounts for each synthetic identity. This is provided by a cloud based email provider. To provide monitoring and control of email, the only access to the email is from the mobile application.

The mobile application provides an in-application access to social media accounts. For example, using the mobile URLs and API from Twitter®, the mobile application provides access to the synthetic identity's Twitter® account. To provide monitoring and control of the social media interactions, the only access to social media should be from the mobile application.

Figure 7:
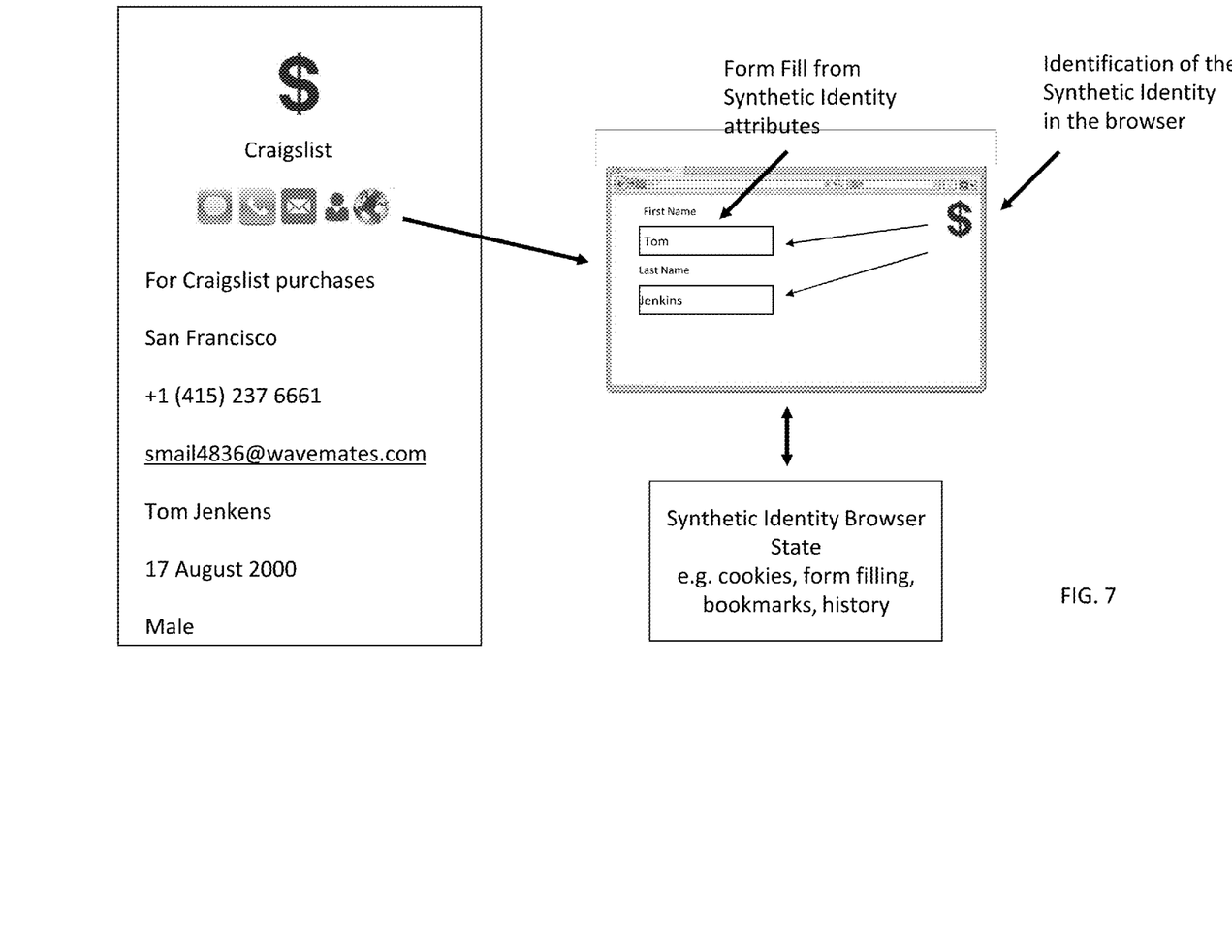
FIG. 7 illustrates automatic web form filling with identity attributes in accordance with an embodiment of the invention.

To provide assistance to the user to stay in-context of their synthetic identity when browsing the web, the mobile application has an in-application browsing capability. As shown in FIG. 7, from the synthetic identity details page the user is able to launch a browser. The browsing experience has been modified to support compartmentalized synthetic identities and the following characteristics. First, a synthetic identity state is supported. Based on previous usages of the browser for this synthetic identity a state is loaded into the browser. This will contain cookies, form filling data, bookmarks, history and other information related to a synthetic identity's previous browsing experience. If this is a new synthetic identity then the browser will be completely clean.

An embodiment provides auto-form filling. When encountering a web page with form fields that match identity attributes, the browser will auto-fill using identity data from the synthetic identity's attribute information.

Synthetic Identity Identification is supported. By using the synthetic identity's title and/or avatar, the user will be able to identify at all times which synthetic identity they are currently using.

The monitoring and analysis service 106 uses information from the mobile operating environment 100, identity services 102 and communication services 104 to identify activities of the identity that are a privacy risk.

By having all synthetic identity communication and configuration in a single mobile application, the invention provides a way for consistent monitoring, analysis and control of synthetic identity use. The mobile application is able to leverage the operating system environment, synthetic identity services and the communication that occurs to provide strong support for the use of the synthetic identities.

Using technology such as an auto-fill in web forms, it is possible to ensure the appropriate synthetic identity attributes are used. However, even if auto-form filling is not occurring automatically, it is possible to monitor the user's input into a web form and highlight any discrepancies.

Figure 8:
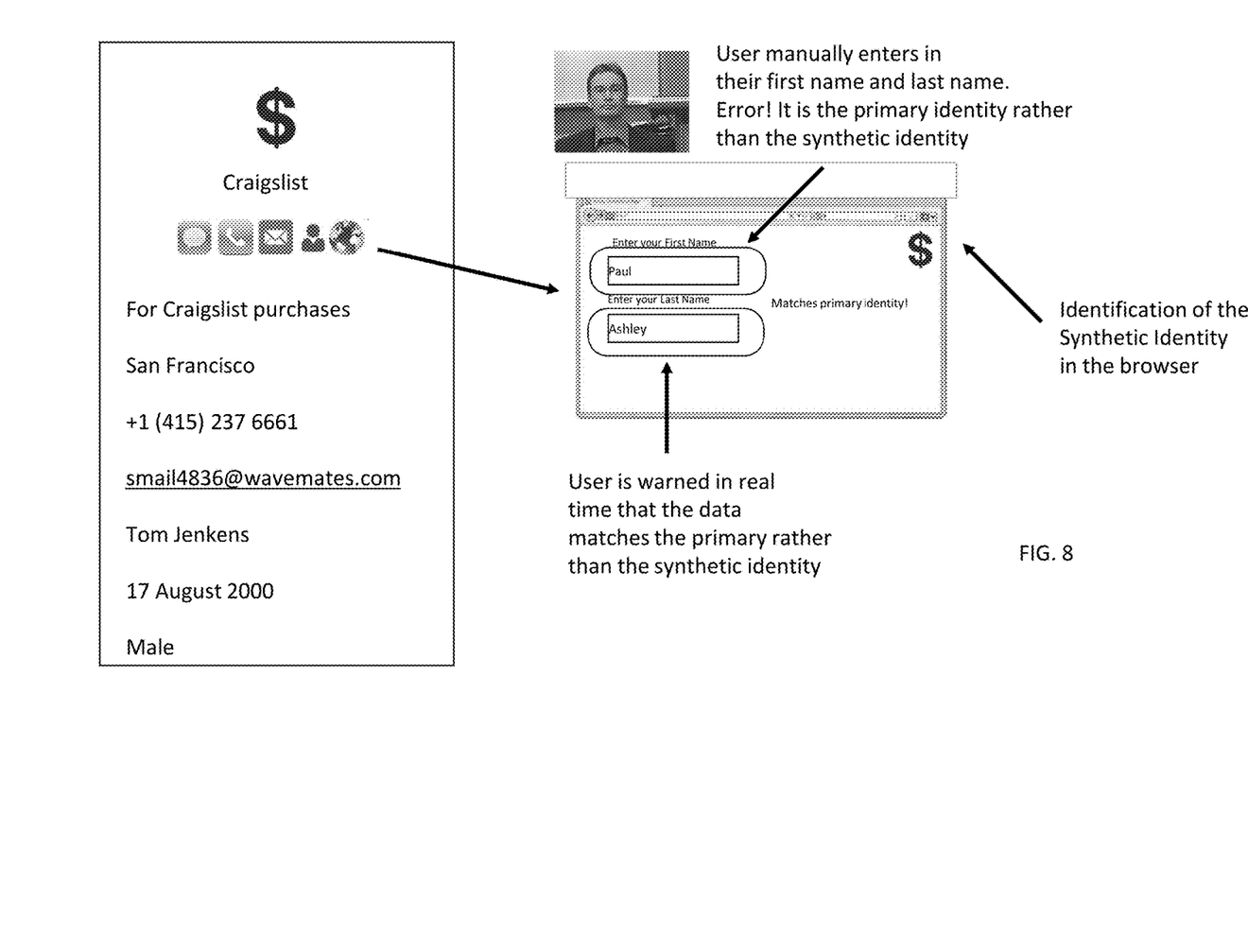
FIG. 8 illustrates a warning supplied in accordance with an embodiment of the invention.

As shown in FIG. 8, the Craigslist synthetic identity has been selected, yet the user has entered first and last name details that do not match the baseline settings for that synthetic identity. Instead they have accidentally entered the first and last name of the primary identity. This is highlighted in real time to the user.

Figure 9:
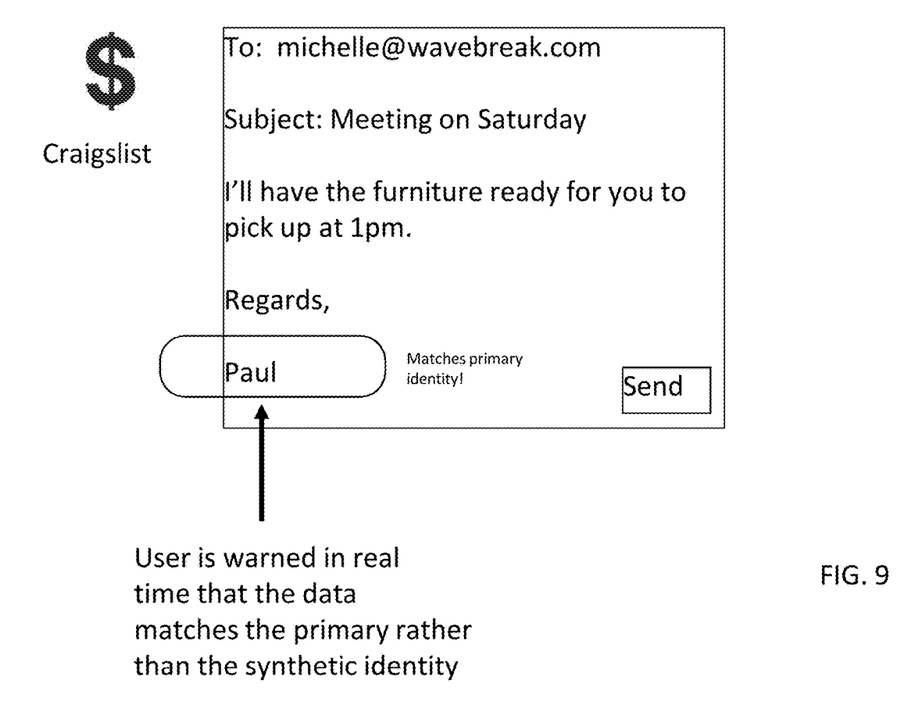
FIG. 9 illustrates another warning supplied in accordance with an embodiment of the invention.

The complexity around protecting privacy when using email relates to the fact that email is free-form. There is no way that it can be auto filled or errors detected in a similar method as with a web form. In the example of FIG. 9, the user is sending an email in the context of a synthetic identity "Craigslist". However, the user has inadvertently finished the email with "Regards Paul", which is the primary identity name. As shown in FIG. 9, the mobile application has marked the error in real time so as to indicate to the user that this signature (which normally is at the end of the email) does not match what is expected in this context. In the example, the user would be forced to override the detection before they can hit "Send".

Whether the user is voice calling, messaging or emailing, one important consideration is the receiver's contact details. It is important to compare the receiver's contact details with entries in the primary and synthetic identity address books. For example, when the user is calling from the Craigslist synthetic identity, but has entered a phone number found in the primary identity's address book, a notice is supplied. The user will need to override the notice or error message before being able to call, as discussed below in connection with FIG. 12.

The user can be warned when selecting the synthetic identity whether the network location, geographic location or time does not meet the baseline settings for the synthetic identity. For example, when a user is on the home screen on the mobile application he may select a synthetic identity to communicate with. Consider the case where the user has five synthetic identities to choose from. The mobile application may warn the user that the mobile device is connected to their work's IP network. A warning symbol shows the user that they have configured their baseline settings not to use the "Dating" and "Sports" identities at this location. Additionally, the voicemail for those identities will be turned on for all incoming calls so that those identities are not bothered by calls.

For in-context browsing, the mobile application compares the web site being accessed against what is defined in the baseline settings. When there is a mismatch, the user is notified. Another embodiment is to perform "training" of the mobile application in the set of web addresses or web categories accessed by a primary identity or synthetic identity. Because the mobile application can view all web sites accessed by an identity, it can notify the user if the identity is doing something uncharacteristic of that particular entity, or something that is characteristic of a separate synthetic identity.

The mobile application checks individual social media sites that are permitted for the synthetic identity as set in the baseline settings. If a user attempts to set up a social media link for a synthetic identity within the mobile application and its does not match the baseline settings, then the user is warned or blocked.

The user notification 108 provides visual guidance when acting as an identity. One technique is to highlight in real time problems using the mobile application user interface. As shown in many of the figures, the user interface of the mobile application is the most convenient way to notify the user of activities that risk the privacy of the user's primary identity. The notifications make it clear to the user why the activity is a risk to the user's identities.

Figure 10:
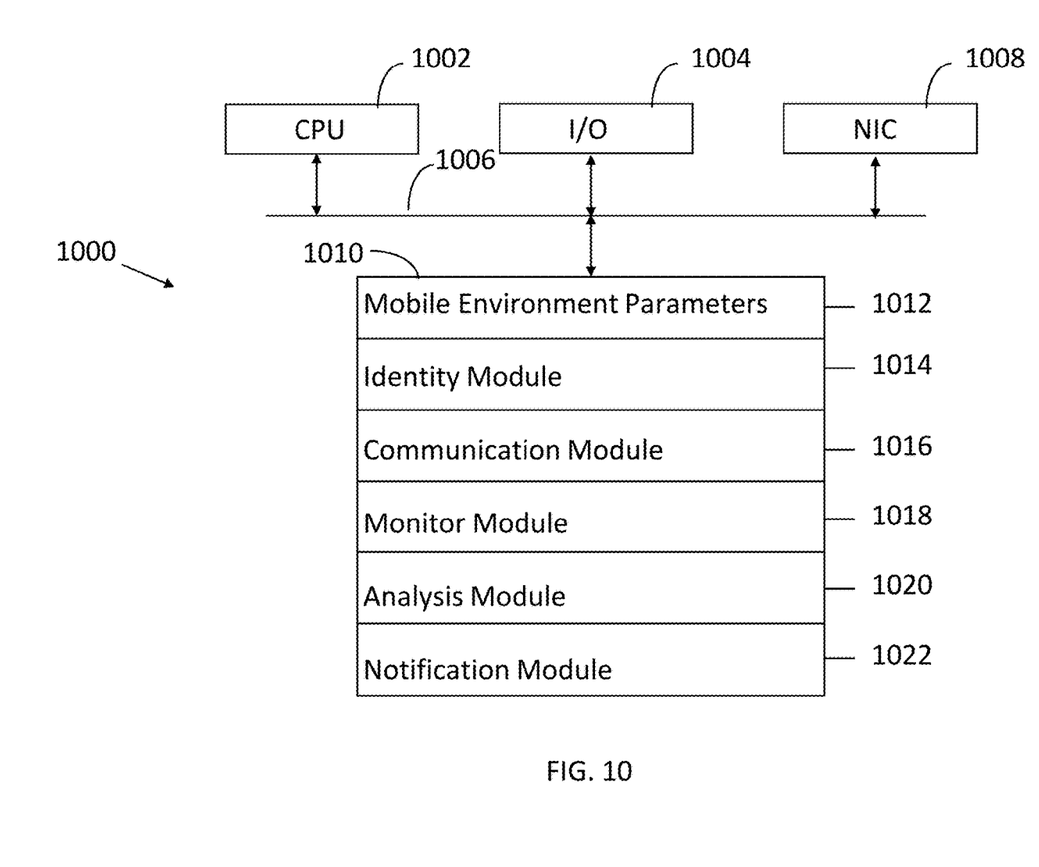
FIG. 10 illustrates a mobile device configured in accordance with an embodiment of the invention.

FIG. 10 illustrates a mobile device 1000 configured in accordance with an embodiment of the invention. The mobile device may be a Smartphone, Tablet, Wearable device and the like. The mobile device 1000 includes standard components, such as a central processing unit 1002 and input/output devices 1004 connected via a bus 1006. The input/output devices 1004 may include a keyboard, touch display and control buttons. A network interface circuit 1008 is also connected to bus 1006 to provide connectivity to a network, which may be any combination of wired and wireless networks. A memory 1010 is also connected to the bus 1006. The memory stores instructions executed by the central processing unit 1002 to implement disclosed operations. In one embodiment, the memory 1010 stores mobile environment parameters 1012. The mobile environment parameters may include a network location, a geographic location and a time, as discussed in connection with block 100 of FIG. 1. An identity module 1014 is also stored in memory 1010. The identity module 1014 may implement the operations discussed in connection with block 102 of FIG. 1. In addition, the identity module 1014 may implement data structures, such as those shown in connection with FIG. 2.

The memory 1010 also stores a communication module 1016. The communication module 1016 includes executable instructions to implement any number of communication services, such as those discussed in connection with block 104 of FIG. 1. The memory 1010 also stores a monitor module 1018 and an analysis module 1020. These modules implement the monitoring and analysis operations disclosed herein, including those operations discussed in connection with block 106. A notification module 1022 provides user notifications of possible activity that may compromise privacy, for example, as shown in FIGS. 8 and 9.

Figure 11:
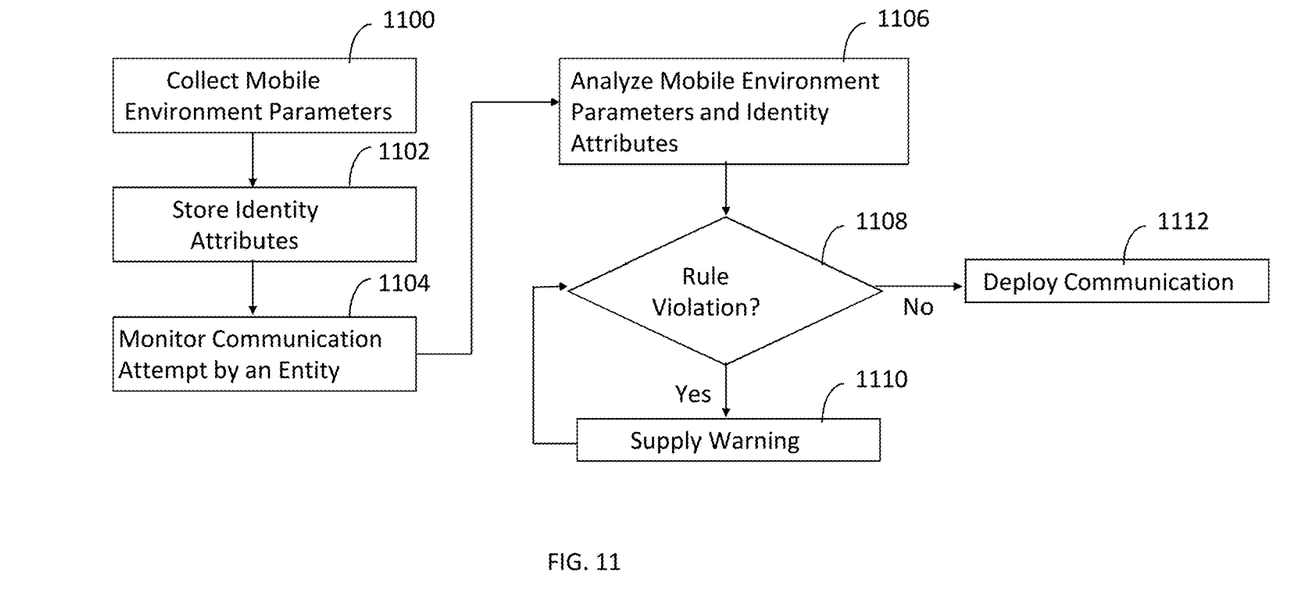
FIG. 11 illustrates processing operations associated with an embodiment of the invention.

FIG. 11 illustrates processing operations implemented by the code stored in memory 1010. Mobile environment parameters are collected 1100. These parameters may be natively available within the mobile device 1000 (e.g., from a GPS chip, a clock, etc.). Identity attributes are then stored 1102. These attributes may be stored in the identity module 1014. A communication attempt by an entity is monitored 1104, for example using the monitor module 1018. The mobile environment parameters and identity attributes are analyzed 1106. This operation may be implemented with the analysis module 1020. It is then determined whether a rule violation exists 1108. If so (1108—Yes) a warning is supplied 1110. The notification module 1022 may be used to supply warnings of the type disclosed herein. If no rule violations exist (1108—No), then the communication is deployed 1112.

Figure 12:
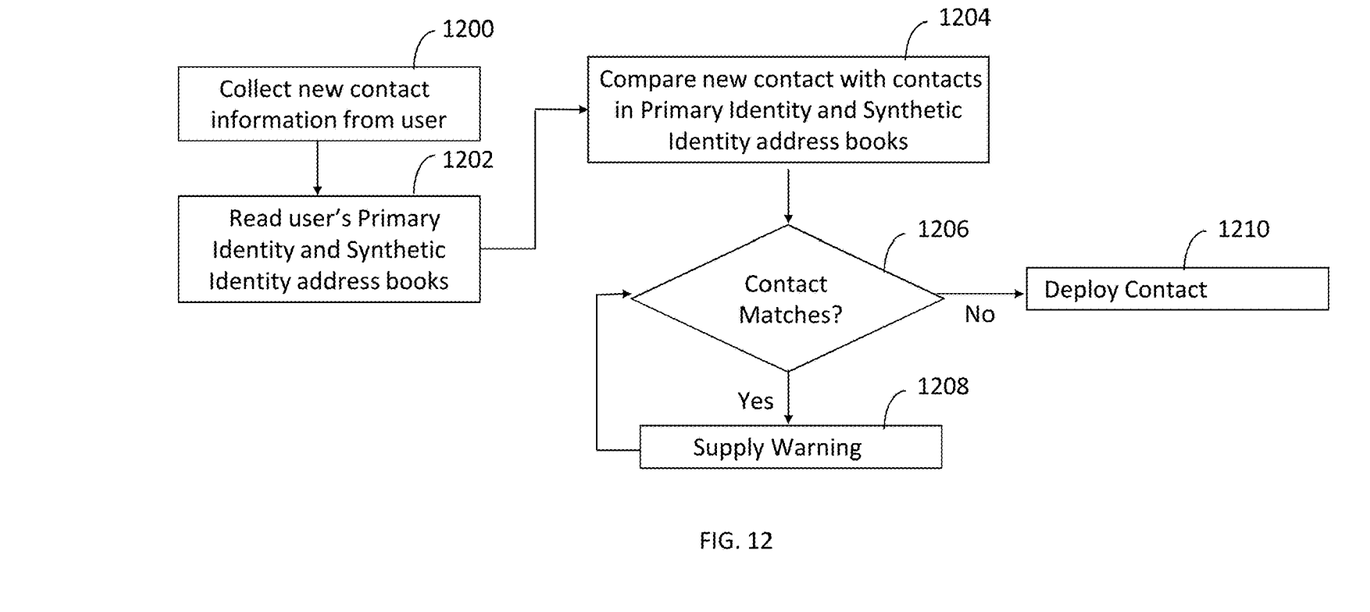
FIG. 12 illustrates processing operations associated with another embodiment of the invention.

FIG. 12 illustrates processing associated with the addition of a new contact. These operations may be implemented by the identity module 1014. More particularly, FIG. 12 illustrates a technique for identifying when adding a contact might indicate the loss of compartmentalization. Initially, new contact information is collected from a user 1200. For example, a user may add a contact to a primary identity address book or a synthetic identity address book. The primary identity address and synthetic identity address books are read 1202.

The new information is compared against contacts in all of the user's address books 1204. If there is a match (1206—Yes), e.g., the user is adding a contact to a synthetic identity address book and that contact is already in the user's primary identity address book or another of their synthetic identities address book, then the user is warned 1208 of the conflict before it is added. The contact matching process could be direct, e.g., same phone number, same email address, same first and last name. Alternately, the matching process could be indirect, e.g., the new contact has the same email domain that another address book contact has. This again might also indicate lack of compartmentalization and the user should be warned. If no contact matches exist (1206—No), the new contact is deployed 1210.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
    collect mobile device environment parameters;
    store identity attributes including real identity attributes for a real individual and at least two sets of synthetic identity attributes each operative as a personal privacy proxy preventing access to the real identity attributes, wherein the at least two sets of synthetic identity attributes each include a synthetic identity name, a synthetic identity phone number and a synthetic identity email address;
    monitor an electronic communication attempt by a designated entity corresponding to a selected synthetic identity that is displayed to the designated entity in a user interface;
    analyze the electronic communication attempt in connection with the mobile device environment parameter and identity attributes to identify a rule transgression risking the privacy of the real identity attributes, wherein the rule transgression is the utilization of a real identity attribute of the real identity attributes for the real individual instead of a synthetic identity attribute of the selected synthetic identity, wherein the designated entity manually enters the real identity attributes in the user interface; and supply a warning in real time in connection with the electronic communication attempt indicating the rule transgression.

2. The non-transitory computer readable storage medium of claim 1 wherein the mobile device environment parameters include a network location, a geographic location and a time.

3. The non-transitory computer readable storage medium of claim 1 wherein the identity attributes are selected from an avatar, a telephone number, an email address, a synthetic name, a birthdate and a gender.

4. The non-transitory computer readable storage medium of claim 1 wherein the identity attributes are selected from a network location restriction, a geographic location restriction and a time restriction.

5. The non-transitory computer readable storage medium of claim 1 wherein the identity attributes are selected from a web site restriction and a social media restriction.

6. The non-transitory computer readable storage medium of claim 1 wherein the electronic communication attempt is selected from a voice call, a text message, a picture message, an email message, a social media interaction and a browsing interaction.

7. The non-transitory computer readable storage medium of claim 1 wherein the instructions executed by the processor include instructions to automatically fill a web form with identity attributes for the designated entity.

8. The non-transitory computer readable storage medium of claim 1 further comprising executable instructions to compare new contact information to existing contact information and selectively supply a warning of potential loss of identity compartmentalization.

* * * * *